(12) United States Patent
Botadra et al.

(10) Patent No.: US 10,790,495 B2
(45) Date of Patent: Sep. 29, 2020

(54) TERMINAL ARRANGEMENT FOR AN ENERGY STORAGE DEVICE

(71) Applicant: Robert Bosch GmbH, Stuttgart (DE)

(72) Inventors: Mehul Botadra, Sterling Heights, MI (US); Robert Schoenherr, Oxford, MI (US)

(73) Assignee: Robert Bosch GmbH, Stuttgart (DE)

( * ) Notice: Subject to any disclaimer, the term of this patent is extended or adjusted under 35 U.S.C. 154(b) by 152 days.

(21) Appl. No.: 15/766,751

(22) PCT Filed: Sep. 28, 2016

(86) PCT No.: PCT/EP2016/073061
§ 371 (c)(1),
(2) Date: Apr. 6, 2018

(87) PCT Pub. No.: WO2017/063878
PCT Pub. Date: Apr. 20, 2017

(65) Prior Publication Data
US 2018/0301686 A1  Oct. 18, 2018

Related U.S. Application Data

(60) Provisional application No. 62/242,364, filed on Oct. 16, 2015.

(51) Int. Cl.
*H01M 2/30* (2006.01)
*H01M 2/20* (2006.01)
(Continued)

(52) U.S. Cl.
CPC ........... *H01M 2/30* (2013.01); *H01M 2/1016* (2013.01); *H01M 2/1077* (2013.01);
(Continued)

(58) Field of Classification Search
CPC .... H01M 2/30; H01M 2/1016; H01M 2/1077; H01M 2/202; H01M 10/613; H01M 10/647; H01M 10/6553
(Continued)

(56) References Cited

U.S. PATENT DOCUMENTS

| 8,802,264 B2 | 8/2014 | Lin et al. | |
|---|---|---|---|
| 2009/0011330 A1* | 1/2009 | Onodera | H01G 9/016 429/179 |

(Continued)

FOREIGN PATENT DOCUMENTS

| GB | 149351 | 10/1921 |
|---|---|---|
| JP | 11345604 A * | 12/1999 |

(Continued)

OTHER PUBLICATIONS

PCT International Search Report for PCT/EP2016/073061.

*Primary Examiner* — Sean P Cullen
(74) *Attorney, Agent, or Firm* — Kelly McGlashen; Maginot, Moore & Beck LLP (57) ABSTRACT

A battery pack includes a two-dimensional or three-dimensional array of battery cells, each cell having a polygonal (i.e, rectangular) shape and a "three side-and-one side" terminal configuration. In some embodiments, the terminal configuration allows the cells to be electrically connected in any configuration, series, parallel, or series parallel simply by changing the orientation of the cell relative to adjacent cells and applying pressure to maintain contact. For a rectangular cell shape, this is achieved by providing three like charged terminals (such as positive) on three respective sides of the cell and one oppositely charged terminal (such as negative) on a fourth side of the cell while maintaining a neutral charge on both of the end surfaces of the cell.

17 Claims, 10 Drawing Sheets

(51) Int. Cl.
  H01M 10/6553 (2014.01)
  H01M 10/647 (2014.01)
  H01M 10/613 (2014.01)
  H01M 2/10 (2006.01)
  H01M 10/0525 (2010.01)

(52) U.S. Cl.
  CPC ......... H01M 2/202 (2013.01); H01M 10/613 (2015.04); H01M 10/647 (2015.04); H01M 10/6553 (2015.04); *H01M 10/0525* (2013.01)

(58) Field of Classification Search
  USPC .......................... 429/156, 158, 159, 160, 178
  See application file for complete search history.

(56) References Cited

U.S. PATENT DOCUMENTS

| | | | |
|---|---|---|---|
| 2012/0064383 | A1 | 3/2012 | Tonomura et al. |
| 2012/0223576 | A1* | 9/2012 | Tsutsumi .............. H01M 2/206 307/9.1 |
| 2013/0224541 | A1* | 8/2013 | Nam ................... H01M 2/1016 429/90 |
| 2013/0273405 | A1* | 10/2013 | Takahashi ......... H01M 10/0436 429/127 |
| 2015/0255838 | A1* | 9/2015 | Inoue .................. H01M 10/625 429/62 |
| 2017/0110696 | A1* | 4/2017 | Schoenherr ......... H01M 2/1077 |
| 2017/0279156 | A1* | 9/2017 | Botadra ............ H01M 10/0409 |

FOREIGN PATENT DOCUMENTS

| | | |
|---|---|---|
| JP | 2006236699 | 9/2006 |
| WO | 2010109882 | 9/2010 |

* cited by examiner

TERMINAL ARRANGEMENT FOR AN ENERGY STORAGE DEVICE

This application is a 35 U.S.C. § 371 National Stage Application of PCT/EP2016/073061, filed on Sep. 28, 2016, which claims the benefit of U.S. Provisional Patent Application No. 62/242,364, filed on Oct. 16, 2015, the disclosures of which are incorporated by reference herein in their entirety.

BACKGROUND

1. Field of the Invention

The present invention relates to a terminal arrangement for an energy storage device such as a battery cell or battery module in which the device has a rectangular housing having opposed ends and four sides, and in which one terminal is associated with one side of the housing, and the other terminal is associated with the three remaining sides of the housing.

2. Description of the Related Art

Battery packs provide power for various technologies ranging from portable electronics to renewable power systems and environmentally friendly vehicles. For example, hybrid electric vehicles (HEV) use a battery pack and an electric motor in conjunction with a combustion engine to increase fuel efficiency. Battery packs are formed of a plurality of battery modules, where each battery module includes several electrochemical cells. The cells may have various housing configurations, including prismatic, cylindrical and pouch. The cells are arranged in stacks and are electrically connected in series or in parallel. Likewise, the battery modules within a battery pack are electrically connected in series or in parallel.

Some current prismatic cells have two terminals located on the top of the cell housing. Some current pouch cells have two terminals. In some cases, both terminals of the pouch cells are located on one edge of the pouch, while in other cases one terminal of the pouch cell is provided on separate edges of the pouch. Cylindrical cells typically have a terminal on each of the opposed ends of the cylindrical cell housing. These terminal configurations limit the ways that the cell can be orientated in a pack (i.e. terminals constrain pack design options). In addition, current battery packs use mechanical cell to cell electrical connections (via, for example, bus bars, cables, fasteners, etc.) as well as connecting processes (for example, laser welding, ultrasonic welding, etc.) to connect the cell terminals of the battery pack to each other, secondary systems, and external loads as well as to facilitate routing circuitry around corners and obstacles. These components and the processes used to manufacture and install them are costly. Moreover, these components consume a large percentage of available space inside a battery pack. For example, in some battery packs, the volume of active material (where active material refers to the anode, the cathode, and separator of the electrode assembly) makes up only about 33 percent of the overall volume of the battery pack. It is desirable to increase the amount of active material within the battery pack to provide increased energy output for a given battery pack volume.

SUMMARY

In some aspects, a battery cell includes a rectangular cell housing including six orthogonal sides, the six surfaces together defining a sealed interior space, and an electrode assembly disposed within the interior space. The electrode assembly includes a first electrode corresponding to a first electric polarity and a second electrode corresponding to a second electric polarity that is opposed to the first electric polarity. The battery cell includes a first terminal electrically connected to the first electrode, and a second terminal electrically connected to a second electrode. A portion of the first terminal is configured to overlie an outer surface of the cell housing on three adjacent sides of the cell housing, and a portion of the second terminal overlies an outer surface of the cell housing on a fourth side that is adjacent to one of the three adjacent sides.

The battery cell may include one or more of the following features: The rectangular cell housing is cubic and includes a first end, an opposed second end, a first side, a second side adjoining the first side, a third side adjoining the second side and being opposed to the first side, and a fourth side adjoining the third side and the first side. The fourth side is opposed to the second side. Each of the first side, the second side, the third side and the fourth side extend between the first end and the second end. The portion of the first terminal overlies an outer surface of the first side, the second side and the fourth side of the cell housing, and the portion of the second terminal overlies an outer surface of the third side of the cell housing. The portion of the first terminal overlies an outer surface of the first end of the cell housing, and the portion of the second terminal overlies an outer surface of the first side, the second end, and the second side. The battery cell is a pouch cell. The battery cell is a prismatic cell. The battery cell has a first dimension, a second dimension, and a third dimension, wherein the second dimension and the third dimension are each an even multiple of the first dimension. The first terminal and the second terminal are elongate strips of electrically conductive material. The first terminal includes a strip of electrically conductive material that wraps around three sides of the cell housing. The first terminal is a strip of electrically conductive material that conforms to the shape of an outer surface of the cell housing. The first terminal and the second terminal are each an electrically conductive band having an inner surface and an outer surface, the inner surface of the first terminal faces and overlies portions of the first side, the second side, and the fourth side, and the inner surface of the second terminal faces and overlies portions of the third side. At least one side of the cell is configured to be electrically neutral.

In some aspects, a battery pack includes a battery pack housing, and a battery cell disposed in the housing. The battery cell includes a rectangular cell housing including six orthogonal sides, the six surfaces together defining a sealed interior space, and an electrode assembly disposed within the interior space, the electrode assembly including a first electrode corresponding to a first electric polarity and a second electrode corresponding to a second electric polarity that is opposed to the first electric polarity. The battery cell includes a first terminal electrically connected to the first electrode, and a second terminal electrically connected to a second electrode. A portion of the first terminal is configured to overlie an outer surface of the cell housing on three adjacent sides of the cell housing, and a portion of the second terminal overlies an outer surface of the cell housing on a fourth side that is adjacent to one of the three adjacent sides.

The battery pack may include one or more of the following features: The rectangular cell housing is cubic and includes a first end, an opposed second end, a first side, a second side adjoining the first side, a third side adjoining the second side and being opposed to the first side, and a fourth side adjoining the third side and the first side. The fourth side is opposed to the second side. Each of the first side, the second side, the third side and the fourth side extend between the first end and the second end. The portion of the first terminal overlies an outer surface of the first side, the second side and the fourth side of the cell housing, and the portion of the second terminal overlies an outer surface of the third side of the cell housing. The portion of the first terminal overlies an outer surface of the first end of the cell housing, and the portion of the second terminal overlies an outer surface of the first side, the second end, and the second side. The battery pack comprises an array of battery cells disposed in the battery pack housing, and each battery cell is disposed in the battery pack housing such that its first terminal faces and forms an electrical connection with the second terminal of an adjacent battery cell. The array of battery cells is arranged in a grid so as to include rows of battery cells and columns of battery cells, each row has a sequential row number and includes n cells, where n is an integer corresponding to the number of cells in the row, all the cells of each row have the same spatial orientation except the nth cell of one of the odd numbered rows and the even numbered rows, and the first cell of the other of the odd numbered rows and the even numbered rows, and all the cells of the row are serially connected, and the nth cell of the one of the odd numbered rows and even numbered rows, and the first cell of the other of the odd numbered rows and the even numbered rows forms an electrical connection with an adjacent row of cells. The nth cell of the one of the odd numbered rows and the even numbered rows, and the first cell of the other of the odd numbered rows and the even numbered rows is rotated 90 degrees relative to the spatial orientation of the other cells of the same row. The battery pack housing includes a base plate and a sidewall that surrounds the base plate, and a one-dimensional array of cells is disposed within the battery pack housing. The array of cells is disposed in the battery pack housing such that a fourth side of each cell rests on the base plate, and a cooling plate abuts a first side of each of the cells.

A "three side-and-one side" terminal configuration for a prismatic cell allows for the reduction or elimination of mechanical cell to cell electrical connections (via, for example, bus bars, cables, fasteners, etc.) as well as connecting processes (for example, laser welding, ultrasonic welding, etc.). This is achieved by orientating three (3) like charged terminals (such as positive) and one (1) oppositely charged terminal (such as negative) around the periphery of an orthogonal cell while maintaining a neutral charge on both of the remaining housing surfaces. The three side-and-one side terminal configuration allows cells to be connected in any configuration, series, parallel, or series parallel simply by changing the orientation of the cell relative to adjacent cells and applying pressure to maintain contact. In some embodiments, use of a cubic cell structure allows for cells to be connected in a multi-layered configuration as well.

The three side-and-one side terminal configuration includes cells having an orthogonal cell design in which there are six (6) orthogonal sides (top, bottom, and four (4) sides). A battery system employing these cells uses terminals attached to the sides as the location for high current connections, voltage, temperature and other sensing functions. Three sides are electrically connected via the terminal in the form of a thin and wide conductive strip that is connected at the point where one current collector, either anode ore cathode, exits the cell housing. On the remaining side, the terminal in the form of another thin and wide conductive strip is connected to the remaining current collector. Both terminals may be adhered to the cell housing via adhesive or an adhesive strip. Cells can be connected together simply by touching sides together to facilitate a series or parallel connection. Also, circuits formed within a cell array can turn corners left, right, up or down by strategically orienting certain cells of the array.

The three side-and-one side terminal configuration provides a means to complete most, if not all of the related circuitry mentioned without the use of extra current carrying components. The cell terminals themselves function as the current carrying device and thus eliminate the need for additional hardware. It also allows for any orientation of the cells within the pack and enhances design options. The three side-and-one side terminal configuration may provide one or more of the following advantages: Bus bars, cables, welding and joining processes are reduced or eliminated; Material packing in the battery pack is improved 20 to 40 percent; Increased energy density of the battery pack; Only one cell part number is required to form a complete battery pack; The complexity of the battery pack is reduced by reducing part count, part numbers, assembly processes, materials, mass (up to 25 percent), and overall cost.

DETAILED DESCRIPTION

Referring to FIGS. 1-6, a battery pack 1 used to provide electrical power includes electrochemical cells 20 that are electrically interconnected and stored in an organized manner within a battery pack housing 2. The cells 20 are lithium-ion cells that include an electrode assembly 60 that is sealed within a cell housing 21 along with an electrolyte to form a power generation and storage unit. In some embodiments, groups of cells 20 may be bundled together to form battery modules (not shown), which in turn are stored within the battery pack housing 2. However, in the illustrated embodiment, the cells 20 are not bundled into modules and instead are directly electrically connected to battery pack housing terminals 6, 7. Within the battery module and/or within the battery pack housing 2, the cells 20 are electrically connected in series or in parallel, as discussed further below.

The cells 20 include a pouch-type cell housing 21 formed of a metal laminated film. The cell housing 21 has a rectangular shape. In the illustrated embodiment, the cell housing 21 is cube shaped, and includes six orthogonal surfaces. The surfaces include a first end 22, a second end 23 that is opposed to the first end 22, a first side 24, a second side 25 adjoining the first side 24, a third side 26 adjoining the second side 25 and being opposed to the first side 24, and a fourth side 27 adjoining the third side 26 and the first side 24, the fourth side 27 being opposed to the second side 25. Each of the first side 24, the second side 25, the third side 26 and the fourth side 27 extend between the first end 22 and the second end 23, and the six surfaces together define a sealed interior space occupied by the electrode assembly 60.

The electrode assembly 60 includes a series of stacked positive electrode plates 61 alternating with negative electrode plates 62 and separated by intermediate separator plates (not shown). The electrode plates are very thin (e.g., having a thickness on the order of about 0.095 to 0.145 mm) compared to the overall cell thickness (e.g. having a thickness on the order of tens or hundreds of mm) and thus are illustrated schematically in FIG. 2. The positive electrode plates 61, the negative electrode plates 62 and the separator plates are oriented parallel to the first end 22 and the second end 23.

Figure 1:
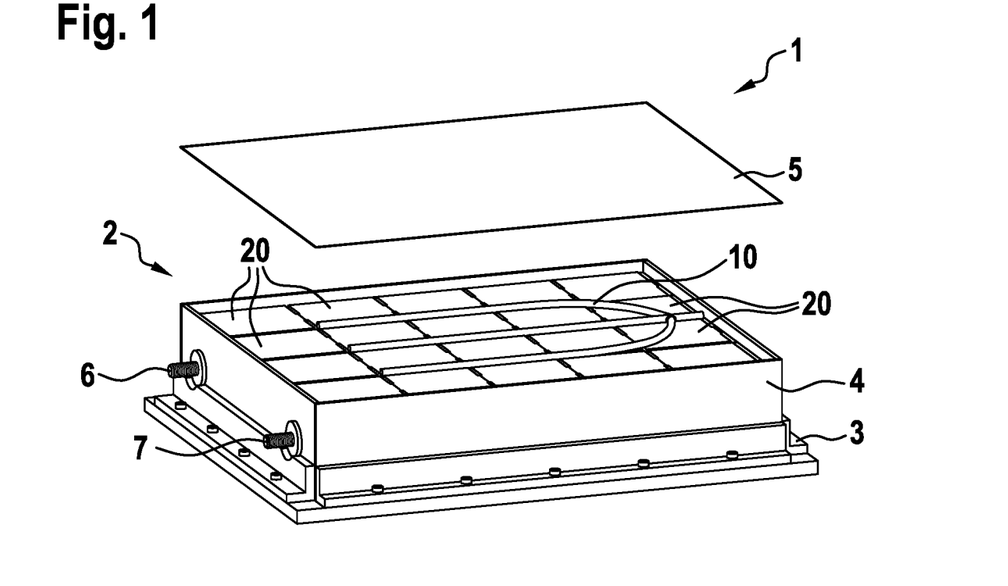
FIG. 1 a partially exploded perspective view of a battery pack including an array of prismatic cells, each cell having a three side-and-one side terminal configuration.
Figure 2:
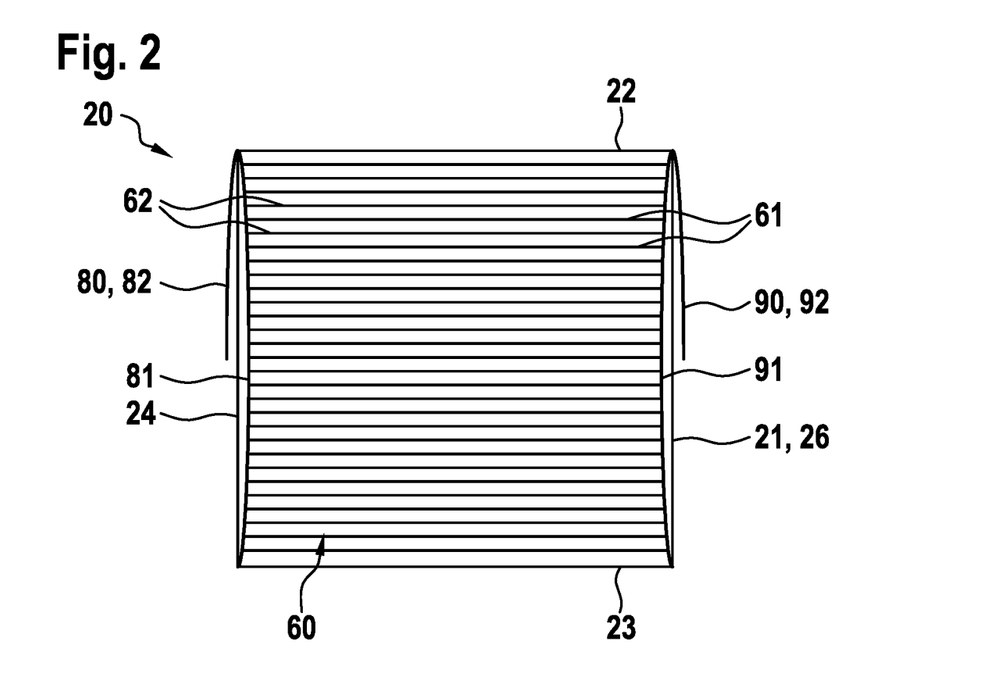
FIG. 2 is a schematic cross sectional view of the prismatic cell of FIG. 1 as seen across line 2-2 of FIG. 3.

An internal portion 81 of a first terminal 80 is electrically connected to the positive electrode plates 61, and an internal portion 91 of a second terminal 90 is electrically connected to the negative electrode plates 62. The first and second terminals 80, 90 are thin strips or bands of electrically conductive material such as copper or aluminum. As used herein, the term "thin strip" refers to an elongated shape in which the material thickness is very small relative to the material width and length, and in which the material width is small relative to the material length. The first and second terminals 80, 90 are sufficiently thin so as to be manually malleable. The first terminal internal portion 81 is disposed between the electrode assembly 60 and the housing first side 24. The second terminal internal portion 91 is disposed on an opposed side of the electrode assembly 60 relative to the first terminal internal portion 81, that is, between the electrode assembly 60 and the housing third side 26. The first and second terminals 80, 90 pass through the first end 22 of the cell housing 21 in a sealed manner.

On an outside of the cell housing 21, the first to leg portion 82 having a proximal end that is connected to the internal portion 81 an jai opposed distal end. The first terminal 80 also includes a band portion 84 formed at the distal end of the leg portion 82. The leg portion 82 and the band portion 84 are arranged in a "T" configuration such that the band portion 84 extends in a direction transverse to the leg portion 82. The second terminal 90 includes a leg portion 92 disposed outside of the cell housing 21. The leg portion 92 has a proximal end that is connected to the internal portion but does not include a transverse band at a distal end thereof.

Figure 3:
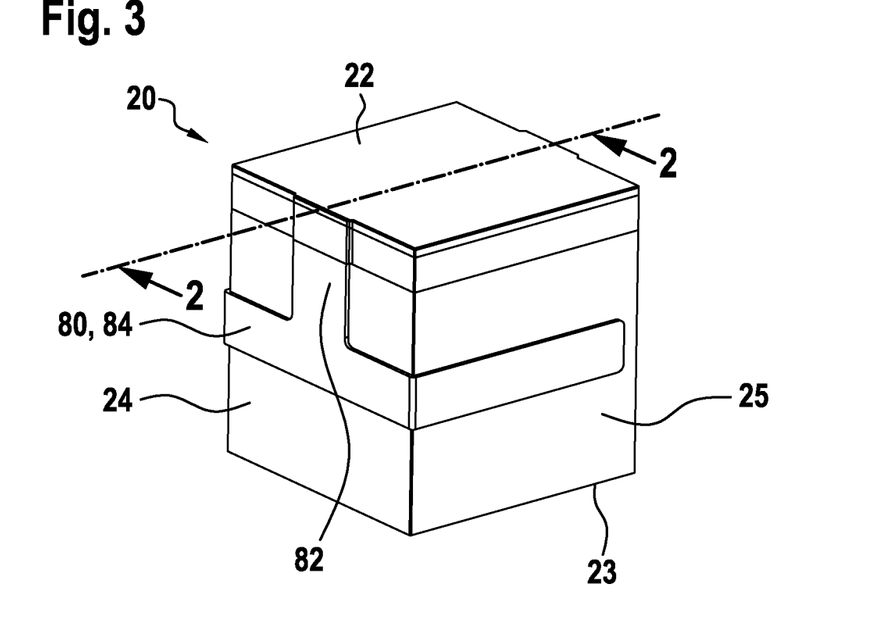
FIG. 3 is a perspective view of the first and second sides of the prismatic cell of FIG. 1.
Figure 6:
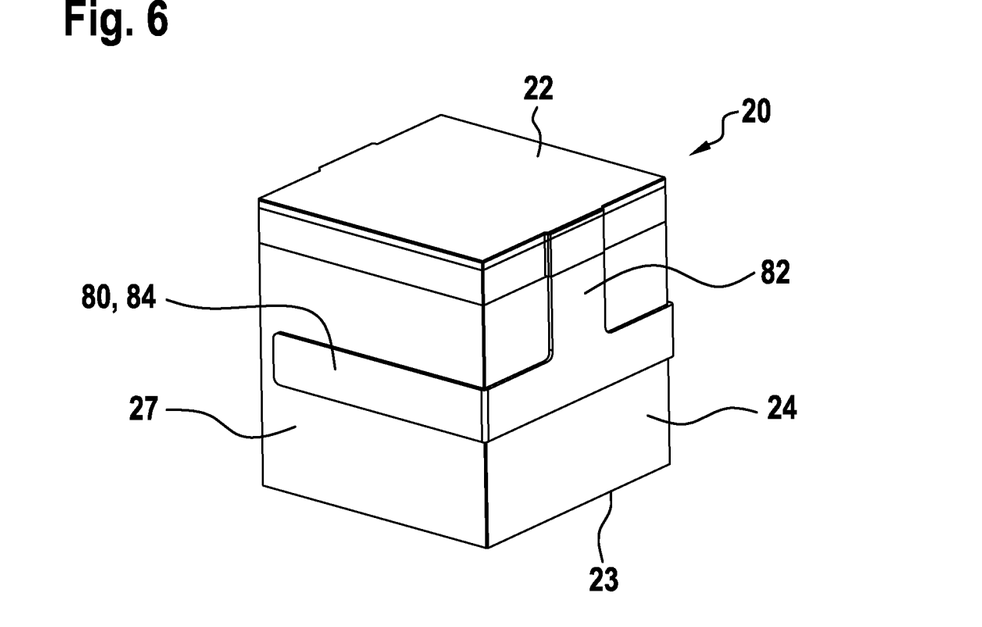
FIG. 6 is a perspective view of the fourth and first sides of the prismatic cell of FIG. 1.

The leg portion 82 of the first terminal 80 protrudes through the first end 22 along the first side 24 in a direction normal to the first end 22, and is folded over the first side 24 so that the leg portion 82 overlies the first side 24. The leg portion 82 has sufficient length to at least overlie an approximate center of the first side 24. The band portion 84 is folded about a circumference of the cell housing 21 to closely overly and conform to the shape of the cell housing 21. The band portion 84 has a length sufficient to permit the band portion 83 to extend along the first side 24 and be wrapped around, and overlie central portions of, the second side 25 and the fourth side 27 (FIGS. 3 and 6). Thus, the band portion 84 overlies three sides of the cell housing 21.

Figure 4:
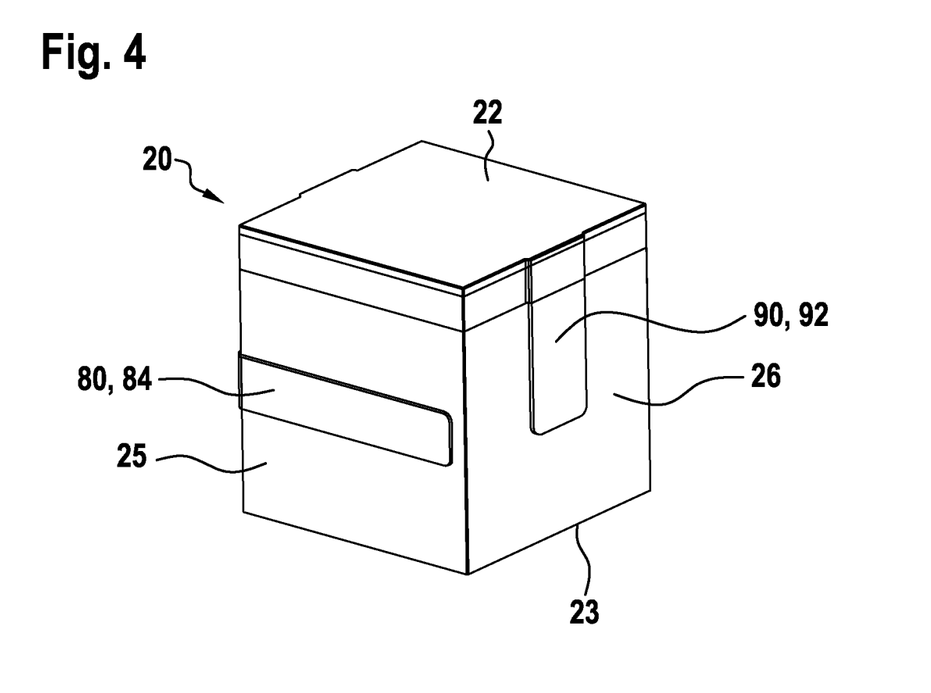
FIG. 4 is a perspective view of the second and third sides of the prismatic cell of FIG. 1.
Figure 5:
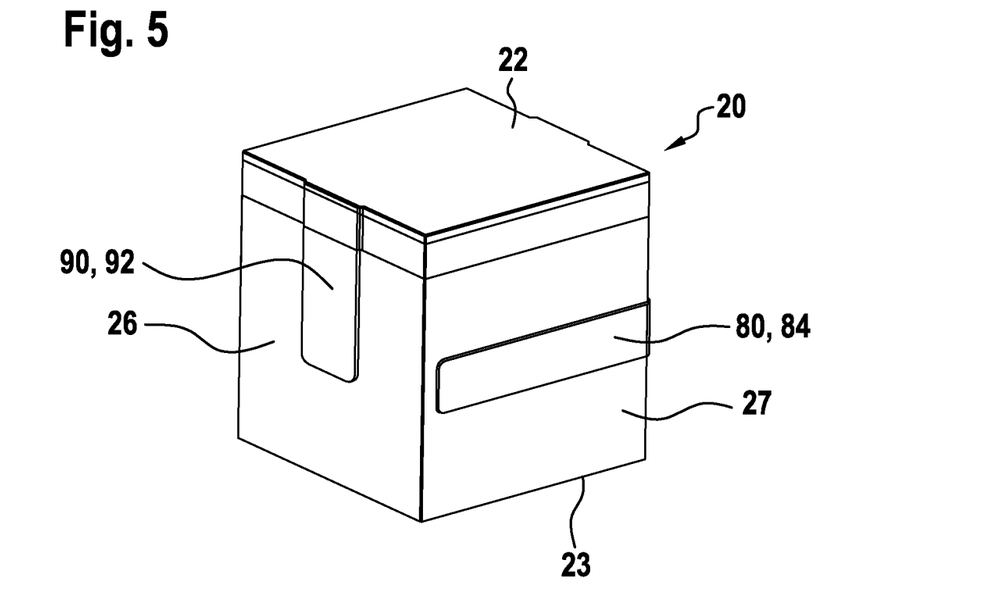
FIG. 5 is a perspective view of the third and fourth sides of the prismatic cell of FIG. 1.

The leg portion 92 of the second terminal 90 protrudes through the first end 22 along the third side 26 in a direction normal to the first end 22, and is folded over the third side 26 so as to overlie the third side 26 (e.g., one side of the cell housing 21). The leg portion 92 has sufficient length to overlie an approximate center of the third side 26 (FIGS. 4 and 5).

No portions of the first or second terminals 80, 90 overlie the first end 22 or the second end 23 of the cell housing 21, and the first end 22 and the second end 23 of the cell housing 21 are each electrically neutral.

In some embodiments, the stiffness of the conductive material is sufficient to retain the first terminal 80 and the second terminal 90 in the above-described folded configuration relative to the cell housing 21. In some embodiments, the first and second terminals 80, 90 are secured to an outer surface of the cell housing 21, for example using adhesive or other techniques.

The above described configuration of the first and second terminals 80, 90 provides a "three side-and-one side" arrangement that permits an array of cells 20 to be electrically interconnected without additional mechanical structures and/or joining processes, since an electrical connection can be formed between adjacent cells 20 simply by spatially orienting and positioning adjacent cells 20 so that terminals of opposed polarity are facing each other and are touching. The direct physical contact between the terminals of opposed polarity results in electrical connections between these terminals. Multiple cells 20 can be arranged in series, parallel or a combination thereof by arranging an array of cells 20 in an appropriate combination of cell orientations. In addition, circuit paths can be made to turn corners by appropriately orienting certain cells 20 of the array.

Referring to FIGS. 1 and 7-10, an exemplary embodiment of a battery pack 1 including an array of cells 20 having a serial arrangement will now be described.

Figure 7:
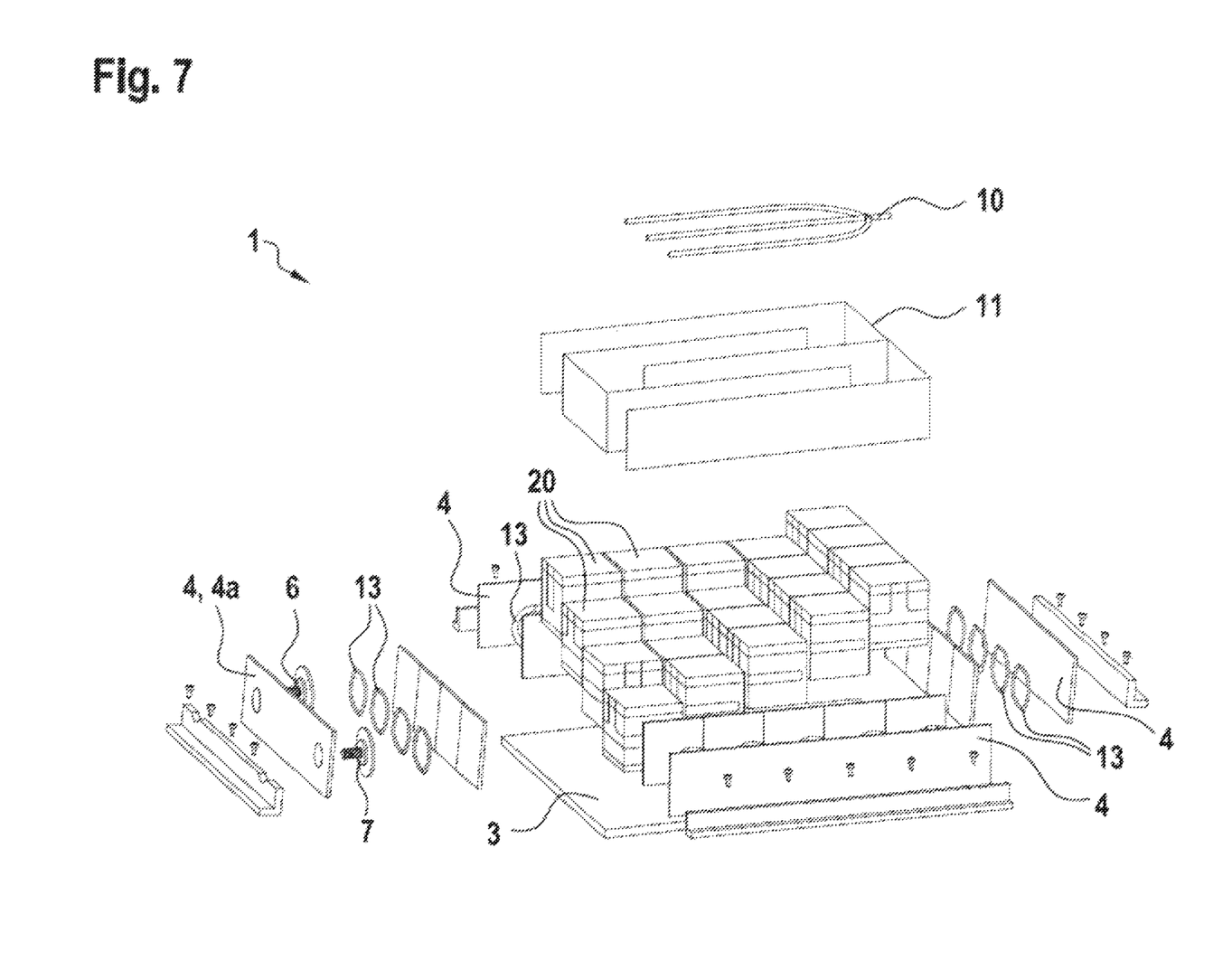
FIG. 7 is an exploded view of the battery pack.

The battery pack housing 2 includes a base plate 3 and a sidewall 4 having one end joined to and surrounding a periphery of the base plate 3. The battery pack housing 2 also includes a lid 5 that is detachably connected to an opposed end of the sidewall 4. The battery pack 1 includes a positive battery pack terminal 6 and a negative battery pack terminal 7 which are supported on, and extend through, a first sidewall portion 4a of the sidewall 4.

Figure 8:
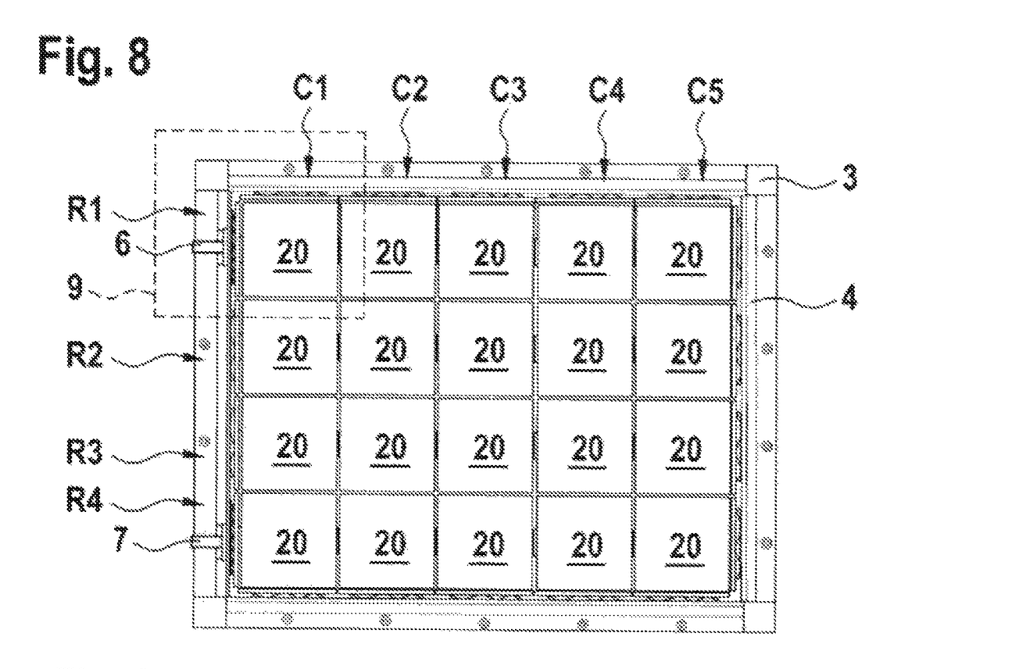
FIG. 8 is a top view of the battery pack with the lid omitted.
Figure 10:
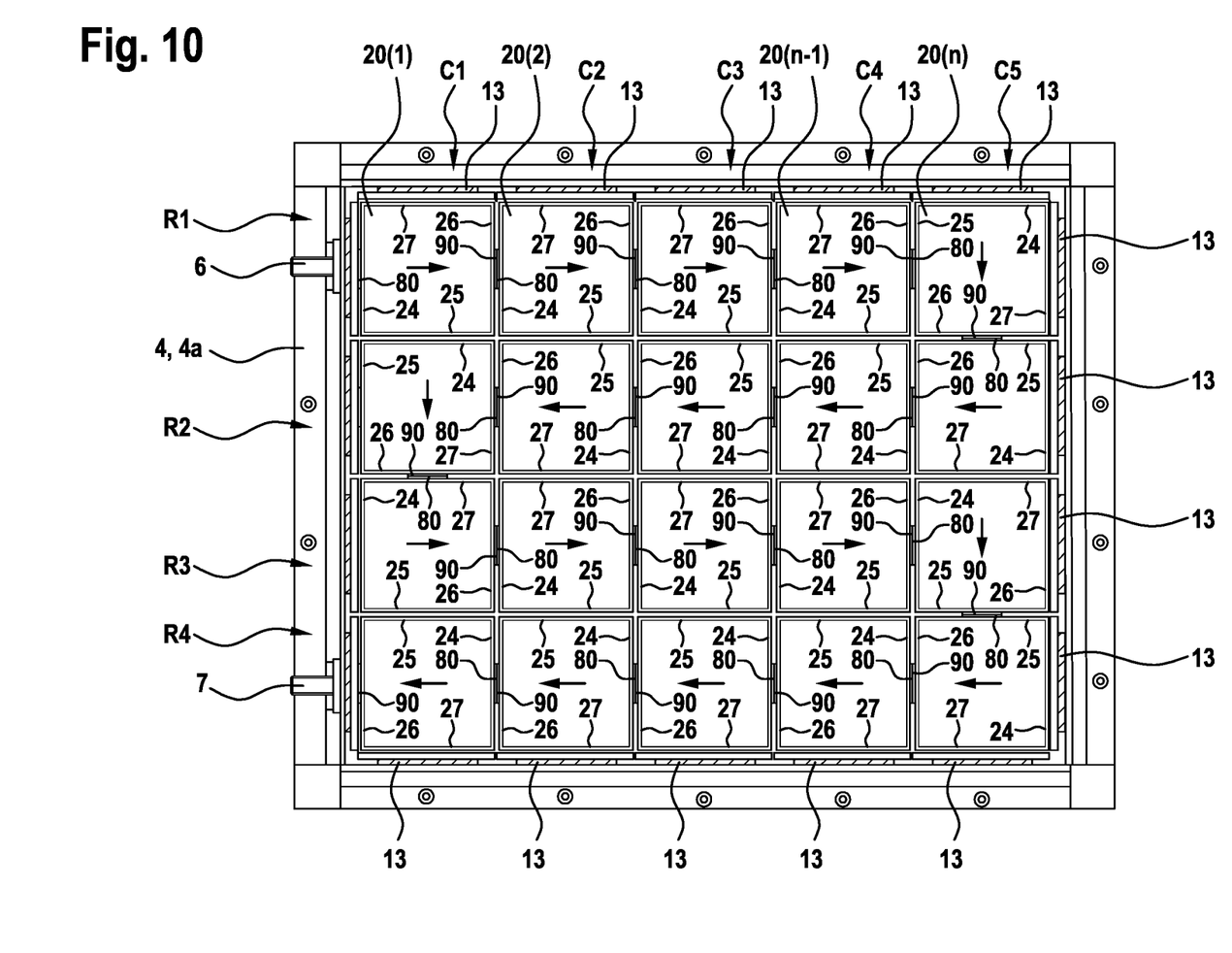
FIG. 10 is a top view of the battery pack with the lid omitted, marked with arrows indicating the serial current path through the array of cells.

The array of battery cells 20 is disposed within the battery pack housing 2 such that an end, for example the second end 23, of each cell 20 faces the base plate 3 of the battery pack housing 2. The cells 20 are arranged in a grid pattern so as to include rows R1, R2, R3, R4 of battery cells 20 and columns C1, C2, C3, C4, C5 of battery cells 20, Each row R1, R2, R3, R4 has a sequential row number and includes n cells 20, where n is an integer corresponding to the number of cells 20 in the row. In the illustrated embodiment, n equals 5. To achieve a serial electrical connection between adjacent cells 20, all the cells 20 of each row R1, R2, R3, R4 have the same spatial orientation except one cell 20 disposed at an end of a given row. For example, the nth cell 20(n) of the odd numbered rows R1, R3 and first cell 20(1) of the even numbered rows R2, R4 have a different spatial orientation than the remaining cells 20 of the same row. The orientation of the one cell at the end of a given row is different from the orientation of the remaining cells of the row to permit the serial electrical connection to be made with the adjacent row.

Figure 9:
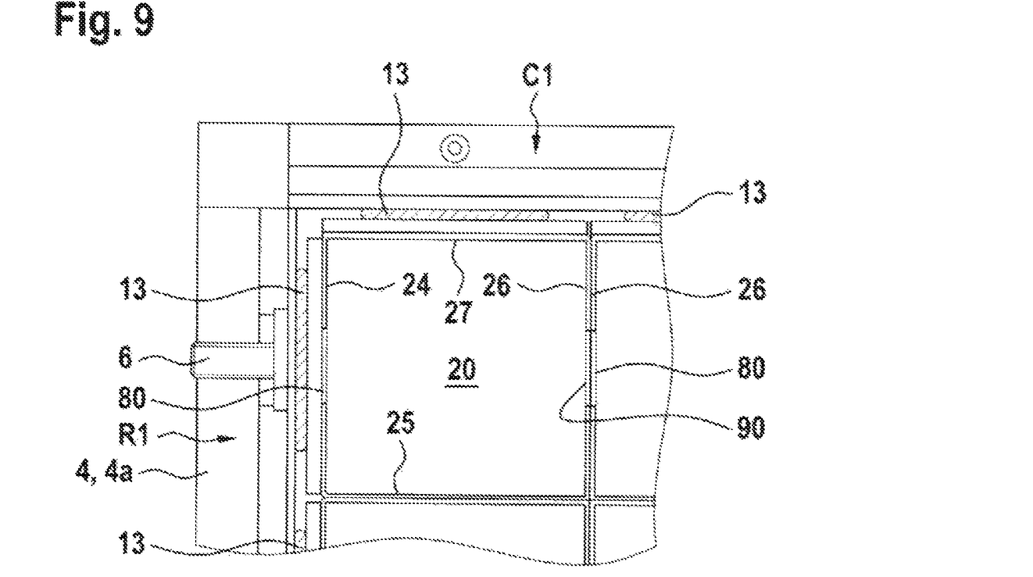
FIG. 9 is an enlarged view of a portion of the battery pack, the portion indicated by the area outlined in dashes in FIG. 8.

In the illustrated embodiment, the cells 20 of the odd numbered rows R1, R3 are arranged so that the first side 24 of the first cell 20(1) through (n−1)th cell 20(n−1) faces the first sidewall portion 4a of the sidewall 4. As a result, the first terminal 80 of the first cell 20(1) of the first row R1 abuts, and forms an electrical connection with, the positive battery pack terminal 6. In addition, the second terminal 90 of the first cell 20(1) through (n−1)th cell 20(n−1) abuts, and forms an electrical connection with the first terminal 80 of the adjacent cell in the row. The nth cell 20(n) of the odd numbered rows R1, R3 is rotated 90 degrees relative to the remaining cells of the same row such that the second side 25 of the nth cell 20(n) faces the first sidewall portion 4a of the sidewall 4 whereby the first terminal 80 forms an electrical connection with second terminal 90 of (the n−1)th cell 20(n−1). In addition, in the odd numbered row, the third side 26 of the nth cell 20(n) faces the second side 25 of the nth cell 20(n) in the adjacent row, whereby the second terminal 90 of the nth cell 20(n) forms an electrical connection with nth cell 20 (n) in the (next) adjacent row.

The second cell 20(2) through nth cells 20(n) of the even numbered rows R2, R4 are arranged so that the third side 26 of the second cell 20(2) through nth cells 20(n) faces the first sidewall portion 4a of the sidewall 4. This orientation of the second cell 20(2) through nth cells 20(n) permits the nth cell 20(n) of the even numbered row R2, R4 to form the serial electrical connection with the nth cell 20(n) of the (previous) adjacent row. By this orientation, the second terminal 90 of the second cell 20(2) through nth cells 20(n) abuts, and forms an electrical connection with the first terminal 80 of the adjacent cell in the row. The first cell 20(1) of the even numbered rows R2, R4 is rotated 90 degrees relative to the remaining cells of the row such that the second side 25 faces the first sidewall portion 4a of the sidewall 4, and the third side 26 faces the (next) adjacent row, whereby the second terminal 90 of the first cell 20(1) forms an electrical connection with first cell 20(1) in the (next) adjacent row.

The electrical connection between adjacent cells 20 is assured by urging the cells 20 of a row together so that the first terminal 80 of one cell contacts and forms an electrical connection with the second terminal 90 of the adjacent cell 20. In some embodiments, a compression force along the cell rows is achieved by providing an elastic member 13 between the cells 20 of the row and the sidewall 4 of the battery pack housing 2. For example, a wave spring 13 can be disposed at one or both ends of each row R1, R2, R3, R4 to ensure positive contact between adjacent cells 20 of the row. Similarly, a wave spring 13 can be disposed at one or both ends of each column C1, C2, C3, C4, C5 to ensure positive contact between adjacent cells 20 of the column.

In the illustrated embodiment, the last row is the fourth row R4, e.g., an even numbered row. However, in order to connect the serially-connected array of cells to the battery pack negative terminal 7 located on the first sidewall portion 4a of the sidewall 4, the first cell 20(1) of the row R4 has the same spatial orientation as the remaining cells 20 of the row R4. As a result, the first cell 20(1) of the last row is oriented so that the second terminal 90 of the first cell 20(1) abuts and forms an electrical connection with the battery pack negative terminal 7 and the first terminal 80 of the first cell 20(1) forms an electrical connection with the second cell 20(2) of the same row R4.

Electrically insulative sheets 11 are disposed between the cells 20 and the battery pack housing 2, as well as between adjacent cell rows except at appropriate row ends to prevent short circuiting of the serial conductive path through the array of cells 20.

The battery pack may also include a sensor lead harness 10 that enables the state of each cell to be monitored. The sensor lead harness 10 may be connected to a battery system controller (not shown) that may disposed within the battery pack housing 2 or at an external location.

Figure 11:
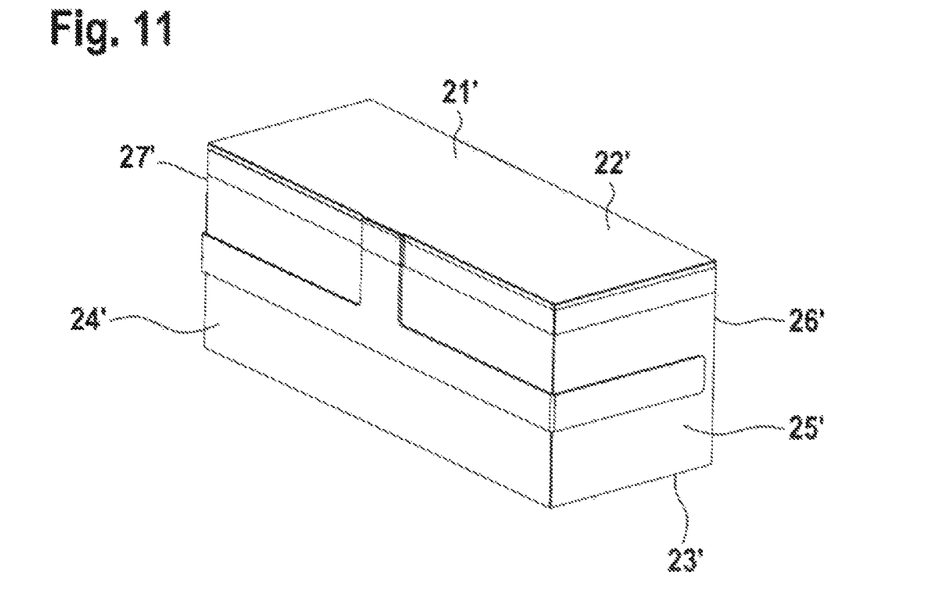
FIG. 11 is a perspective view of the first and second sides of an alternative prismatic cell.
Figure 12:
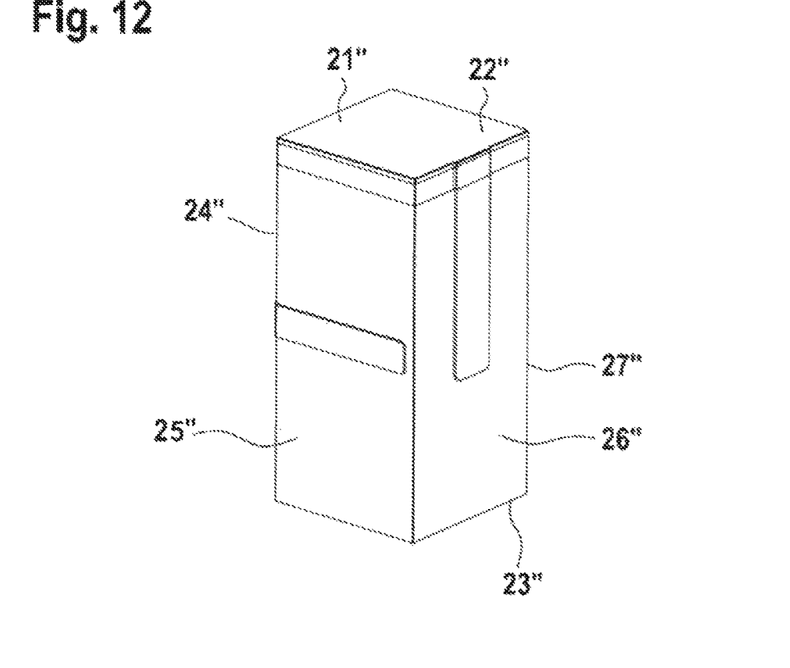
FIG. 12 is a perspective view of the second and third sides of another alternative prismatic cell.

Although the cell 20 has a cube-shaped cell housing 21, the cell housing 21 is not limited to a cube shape. For example, the cell housing 21 may be rectangular in shape. In one alternative embodiment illustrated in FIG. 11, the cell housing 21' has first and third sides 24',26' and first and second ends 22',23' that are elongated whereas the second and fourth sides 25',27' are square. In another alternative embodiment illustrated in FIG. 12, the sides 24",25", 26", 27" of the cell housing 21" are elongated whereas the first and second ends 22",23" are square. When the cell housing 21 is rectangular in shape, providing the surface dimensions such that the first dimension (i.e., length) and the second dimension (i.e., width) of the cell housing 21 are each an even multiple of the third dimension (i.e., height) of the cell housing 21 permits close stacking and packing of cells 20 in two and three dimensional arrays. In still other alternative embodiments, the cell housing 21 may have other polygonal shapes that permit close packing such as an eight surface structure having hexagonally arranged sides (not shown).

Figure 13:
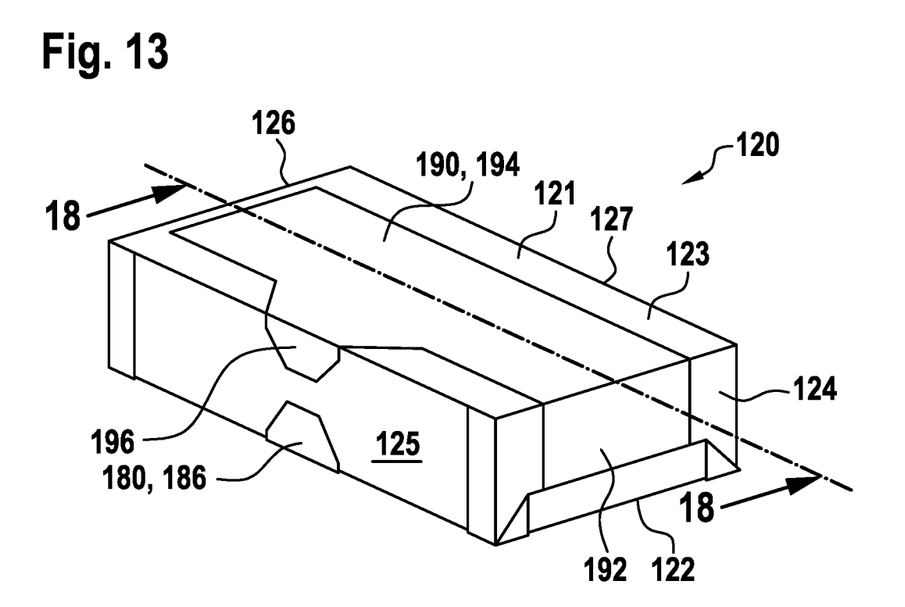
FIG. 13 is a second end perspective view of yet another alternative prismatic cell.
Figure 14:
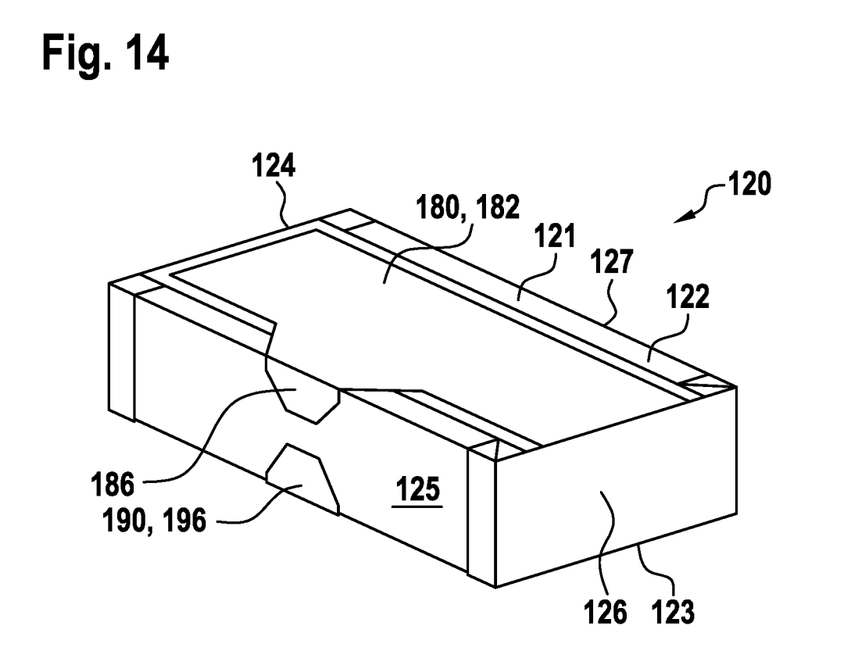
FIG. 14 is a first end perspective view of the prismatic cell of FIG. 13.
Figure 15:
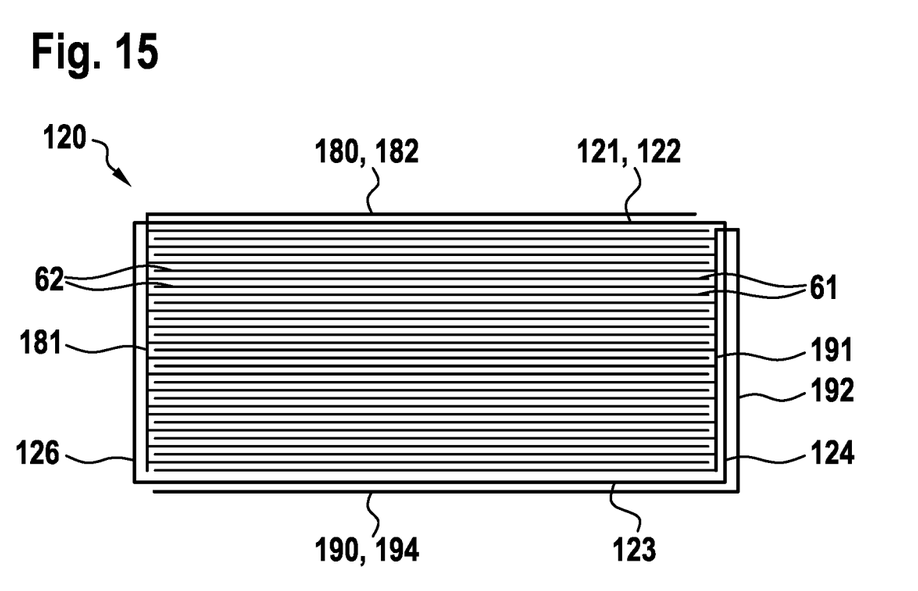
FIG. 15 is a schematic cross sectional view of the prismatic cell of FIG. 13 as seen across line 18-18 of FIG. 13.

Referring to FIGS. 13-15, an alternative embodiment cell 120 includes a cell housing 121 that is a pouch-type cell housing formed of a metal laminated film. The cell housing 121 has a rectangular shape. The cell housing 121 has proportions similar to those of a conventional prismatic cell housing. In particular, since the cell length, width and height are each a different dimension, each side of the cell housing 121 is elongated. The cell housing 121 has six orthogonal surfaces, including a first end 122, a second end 123 that is opposed to the first end 122, a first side 124, a second side 125 adjoining the first side 124, a third side 126 adjoining the second side 125 and being opposed to the first side 124, and a fourth side 127 adjoining the third side 126 and the first side 124, the fourth side 127 being opposed to the second side 125. Each of the first side 124, the second side 125, the third side 126 and the fourth side 127 extend between the first end 122 and the second end 123, and the six surfaces together define a sealed interior space occupied by the electrode assembly 60. The first and second ends 122, 123 have a larger area than the second and fourth sides 125, 127, and the second and fourth sides 125, 127 have a larger area than the first and third sides 124, 126.

Like the previous embodiment, the electrode assembly 60 is sealed within the cell housing 121 along with an electrolyte to form a power generation and storage unit. The positive electrode plates 61, the negative electrode plates 62 and the separator plates (not shown) of the electrode assembly 60 are oriented parallel to the first end 122 and the second end 123.

An internal portion 181 of a first terminal 180 is electrically connected to the positive electrode plates 61, and an internal portion 191 of a second terminal 190 is electrically connected to the negative electrode plates 162. The first and second terminals 180, 190 are thin strips or bands of electrically conductive material such as copper or aluminum. As used herein, the term "thin strip" refers to an elongated shape in which the material thickness is very small relative to the material width and length, and in which the material width is small relative to the material length. The first and second terminals 180, 190 are sufficiently thin so as to be manually malleable.

The first terminal internal portion 181 is disposed between the electrode assembly 60 and the housing third side 126. The second terminal internal portion 191 is disposed on an opposed side of the electrode assembly 60 relative to the first terminal internal portion 181, that is, between the electrode assembly 60 and the housing first side 124. The first and second terminals 180, 190 pass through the first end 122 of the cell housing 121 in a sealed manner.

The first terminal 180 protrudes through the first end 122 along the third side 126 in a direction normal to the first end 122, and is folded over an outer surface of the first end 122 so that a leg portion 182 overlies the first end 122. The leg portion 182 has sufficient length to at least overlie an approximate center of the first end 122. In the illustrated embodiment, the leg portion 182 extends nearly to the third side 126.

The second terminal 190 protrudes through the first end 122 along the first side 124 in a direction normal to the first end 122, and is folded over an outer surface of the first side 124. The second terminal 190 has sufficient length to overlie both the first side 124 and at least to overlie an approximate center of the second end 123. In particular, the second terminal 190 includes a first leg portion 192 that overlies the first side 124, and second leg portion 194 oriented transverse to the first leg portion 192 so as to overlie the second end 123.

The first terminal 180 includes a first tab 186 that protrudes from the leg portion 182 and folds over a portion of the housing second side 125. Thus, the first terminal 180 overlies two sides of the cell housing 121 (e.g., the first end 122 and the second side 125). In addition, the second terminal 190 includes a second tab 196 that protrudes from the second leg portion 194 and folds over a portion of the housing second side 125. Thus, the second terminal 190 overlies three sides of the cell housing 121 (e.g., the first side 124, the second end 123 and the second side 125). Along the second side 125, the first and second tabs 186, 196 are disposed midway between the first side 124 and the third side 126, and are spaced apart such that a gap exists between the first tab 186 and the second tab 196.

No portions of the first or second terminals 180, 190 overlie the housing fourth side 127, and the housing fourth side 127 is electrically neutral.

In some embodiments, the stiffness of the conductive material used to form the first and second terminals 180, 190 is sufficient to retain them in the above-described folded configuration relative to the cell housing 121. In some embodiments, the first and second terminals 180, 190 are secured to an outer surface of the cell housing 121, for example using adhesive or other techniques.

Figure 16:
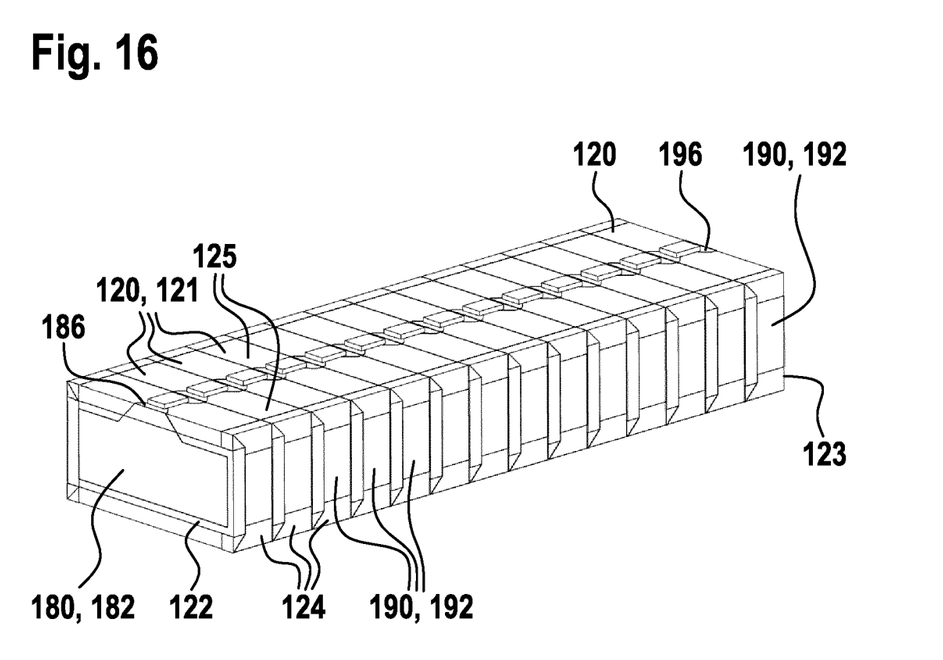
FIG. 16 is an array of cells of the configuration shown in FIG. 13 as would be assembled in a battery pack.

Referring to FIG. 16, the above described configuration of the first and second terminals 180, 190 provides a "three side-and-two side" arrangement that permits an array of cells 120 to be electrically interconnected without additional mechanical structures and/or joining processes, since an electrical connection can be formed between adjacent cells 120 simply by spatially orienting and positioning adjacent cells 120 so that terminals of opposed polarity are facing each other and are touching. The direct physical contact between the terminals of opposed polarity results in electrical connections between these terminals. Multiple cells 120 can be arranged in series by arranging the cells 120 in a 1×n array. For example, in the embodiment illustrated in FIG. 16, the cells 120 are arranged in a 1×14 array suitable for use in a battery pack 1.

Figure 17:
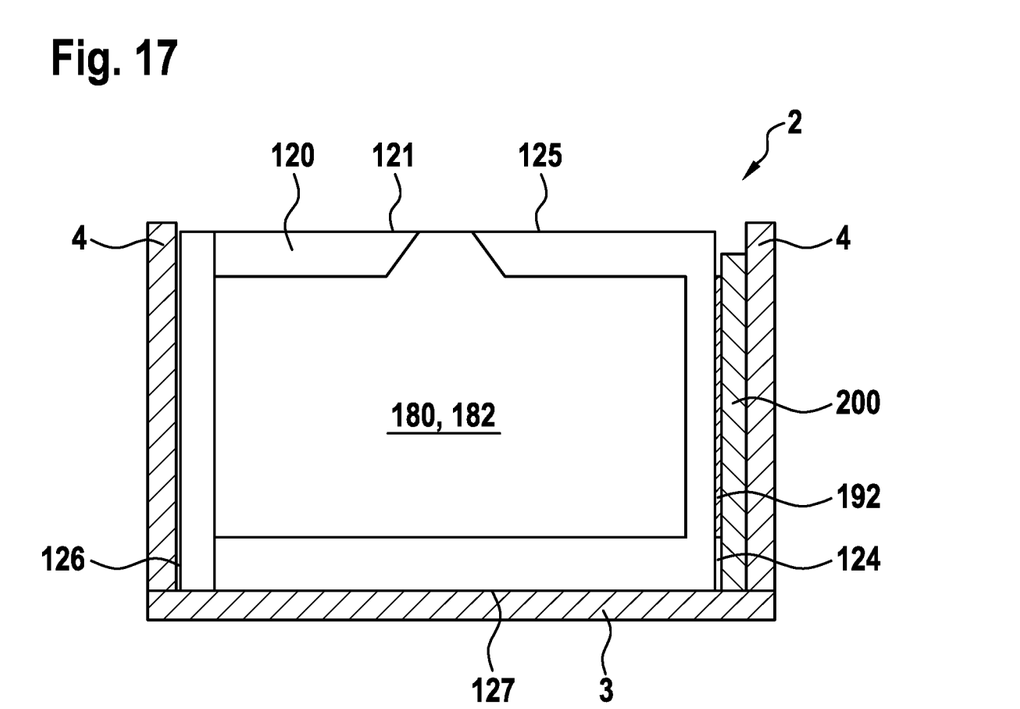
FIG. 17 is a cross-sectional view of a battery pack housing with the lid omitted and including cells of the configuration shown in FIG. 13.

Referring to FIG. 17, in the array, the fourth side 127 of each cell rests on the battery pack housing base plate 3. In addition, each cell 120 is arranged such that the second end 123 of one cell faces and abuts the first end 122 of an adjacent cell. As a result, the second leg portion 194 of the second terminal 190 of one cell 120 abuts, and forms an electrical connection with, the leg portion 182 of the first terminal 180 of the adjacent cell 120. In the array, the cell first sides 124 are coplanar. Since the first leg portion 192 of the second terminal 190 overlies the cell first side 124, a cooling plate 200 may be disposed along cell housing first sides 124 in contact with the first leg portions 192 of each cell 120. In some embodiments, the cooling plate 200 may be welded to each second terminal 190. The cooling plate 200 may provide highly efficient cooling of the cells 120 due to the direct thermal conductive path between the negative electrode plates 62 and the cooling plate 200 via the second terminal 190.

Within the array, the cell second sides 125 are also coplanar. Since the terminal tabs 186, 196 overlie the cell second side 125, cell monitoring sensors (shown schematically as rectangles in FIG. 16) and/or a battery management control circuit can easily contact the tabs 186, 196 and form an electrical contact therewith.

Although the illustrated embodiments include pouch-type lithium-ion cells 20 that include a "stacked" electrode assembly, the cells 20 are not limited to this cell housing type and/or electrode configuration. For example, the cells 20 may have a prismatic housing and contain a "jelly roll" electrode assembly. In another example, the cells 20 may have a pouch-type housing and contain a "folded" electrode assembly. In still another example, the cells 20 may have a pouch type housing and contain a "jelly roll" electrode assembly.

In the illustrated embodiments, the first terminal 80, 180 is connected to the positive electrode plates 61, and the second terminal 90, 190 is connected to the negative electrode plates 62. However, it is contemplated that the first terminal 80 may be connected to the negative electrode plates 62, and the second terminal 90 may be connected to the positive electrode plates 61.

In the illustrated embodiments, the terminals 80, 90, 180, 190 are strategically arranged on the outer surface of the cell housing so as to permit the cell housing 21 to form various electrical connections based on the orientation of the cell housing 21. However, strategic portions of the cell housing 21 can be directly connected to the positive and negative electrodes 61, 62 in order to achieve the same effect without employing terminals. For example, the first, second and fourth sides of the cell housing can be directly connected to the positive electrode, and the third side of the cell housing can be directly connected to the negative electrode. Thus the sides 24, 25, 26, 27 of the cell housing 21 can perform the function of the terminals 80, 90, 180, 190 and form electrical connections with adjacent cells.

In the illustrated embodiment, the battery pack 1 includes a two-dimensional array of cells 20 having four rows R1, R2, R3, R4 and five columns C1, C2, C3, C4, C5. However, the battery pack 1 is not limited to a two-dimensional array, and may alternatively house a three-dimensional array of cells 20. In addition, the number of rows and columns provided in the array is not limited to four rows and five columns, rather, the number of rows and columns is determined at least in part by the power and space requirements of the specific application, and size and shape of the cells 20 used to form the array.

In the illustrated embodiment, the three side-and-one side terminal arrangement is provided on the cell housing to permit electrical interconnections between adjacent battery cells 20. However, the three side-and-one side terminal arrangement may alternatively be provided on other types of energy storage devices such as, but not limited to, battery modules to permit electrical interconnections between adjacent battery modules.

Selective illustrative embodiments of the battery cell and cell housing are described above in some detail. It should be understood that only structures considered necessary for clarifying these devices have been described herein. Other conventional structures, and those of ancillary and auxiliary components of the battery system, are assumed to be known and understood by those skilled in the art. Moreover, while working examples of the battery cell and battery cell housing been described above, the battery cell and/or battery cell housing is not limited to the working examples described above, but various design alterations may be carried out without departing from the devices as set forth in the claims.

What is claimed is:

1. A battery cell comprising
a rectangular cell housing including six orthogonal sides, the six, orthogonal sides together defining a sealed interior space, the six orthogonal sides including a first end, an opposed second end, a first side, a second side adjoining the first side, a third side adjoining the second side and being opposed to the first side, and a fourth side adjoining the third side and the first side, the fourth side being opposed to the second side, each of the first side, the second side, the third side and the fourth side extending between the first end and the second end,
an electrode assembly disposed within the interior space, the electrode assembly including a first electrode corresponding to a first electric polarity and a second electrode corresponding to a second electric polarity that is opposed to the first electric polarity,
a first terminal electrically connected to the first electrode, and
a second terminal electrically connected to a second electrode, wherein
the first terminal and the second terminal do not overlie at least one of the first end and the second end,
a portion of the first terminal overlies an outer surface of the first side, the second side and the fourth side, and the first terminal does not overlie the third side, and
a portion of the second terminal overlies an outer of the third side, and the second terminal does not overlie the first side, the second side and the fourth side.

2. The battery cell of claim 1, wherein the battery cell is a pouch cell.

3. The battery cell of claim 1, wherein the battery cell has a first dimension, a second, dimension, and a third dimension, Wherein the second dimension and the third dimension are each an even multiple of the first dimension.

4. The battery cell of claim 1, wherein the first terminal and the second terminal are elongate strips of electrically conductive material.

5. The battery cell of claim 1, wherein the first terminal includes a strip of electrically conductive material that wraps around three sides of the cell housing.

6. The battery cell of claim 1, wherein the first terminal is a strip of electrically conductive material that conforms to the shape of an outer surface of the cell housing.

7. The battery cell of claim 1, wherein at least one side of the cell is configured to be electrically neutral.

8. The battery cell of claim 1, wherein the battery cell is a prismatic cell.

9. The battery cell of claim 1, wherein
the rectangular cell housing is cubic.

10. The battery cell of claim 9, wherein the first terminal and the second terminal are each an electrically conductive band having an inner surface and an outer surface, the inner surface of the first terminal faces and overlies central portions of the first side, the second side, and the fourth side, and the inner surface of the second terminal faces and overlies a central portion of the third side.

11. A battery pack comprising
a battery pack housing, and
a battery cell disposed in the housing, the battery cell comprising
a rectangular cell housing including six orthogonal sides, the six orthogonal sides together defining a sealed interior space, the six orthogonal sides including a first end, an opposed second end, a first side, a second side adjoining the first side, a third side adjoining the second side and being opposed to the first side, and a fourth side adjoining the third side and the first side, the fourth side being opposed to the second side, each of the first side, the second side, the third side and the fourth side extending between the first end and the second end,
an electrode assembly disposed within the interior space, the electrode assembly including a first electrode corresponding to a first electric polarity and a second electrode corresponding to a second electric polarity that is opposed to the first electric polarity,
a first terminal electrically connected to the fast electrode, and
a second terminal electrically connected to a second electrode,
wherein
the first terminal and the second terminal do not overlie at least one of the first end and the second end,
a portion of the first terminal overlies an outer surface of the first side, the second side and the fourth side, and the first terminal does not overlie the third side, and
a portion of the second terminal overlies an outer surface of the third side, and the second terminal does not overlie the first side, the second side and the fourth side.

12. The battery pack of claim 11, wherein
the rectangular cell housing is cubic.

13. The battery pack of claim 11, wherein the battery pack housing, includes a base plate and a sidewall that surrounds the base plate, and the battery cell comprises an array of cells.

14. The battery pack of claim 13, wherein the array of cells is disposed in the battery pack housing such that the second end of each cell faces the base plate.

15. The battery pack of claim 11, wherein the battery cell comprises an array of battery cells disposed in the battery pack housing, each battery cell is disposed in the battery pack housing such that its first terminal faces and forms an electrical connection with the second terminal of an adjacent battery cell.

16. The battery pack of claim 15, wherein the array of battery cells is arranged in a grid so as to include rows of battery cells and columns of battery cells, each row has a sequential row number and includes n cells, where n is an integer corresponding to the number of cells in the row, all the cells of each row have the same spatial orientation except the nth cell of one of the odd numbered rows and the even numbered rows, and the first cell of the other of the odd numbered rows and the even numbered rows, and all the cells of the row are serially connected, and the nth cell of the one of the odd numbered rows and even numbered rows, and the first cell of the other of the odd numbered rows and the even numbered rows forms an electrical connection with an adjacent row of cells.

17. The battery pack of claim 16, wherein the nth cell of the one of the odd numbered rows and the even numbered rows, and the first cell of the other of the odd numbered rows and the even numbered rows is rotated 90 degrees relative to the spatial orientation of the other cells of the same row.

* * * * *

UNITED STATES PATENT AND TRADEMARK OFFICE
CERTIFICATE OF CORRECTION

PATENT NO. : 10,790,495 B2  
APPLICATION NO. : 15/766751  
DATED : September 29, 2020  
INVENTOR(S) : Mehul Botadra et al.

Page 1 of 1

It is certified that error appears in the above-identified patent and that said Letters Patent is hereby corrected as shown below:

In the Claims

In Claim 1, at Column 11, Lines 33-34: "the six, orthogonal sides" should read --the six orthogonal sides--.

In Claim 1, at Column 11, Lines 56-57: "an outer of the third side" should read --an outer surface of the third side--.

In Claim 3, at Column 11, Line 62: "a second, dimension" should read --a second dimension--.

In Claim 3, at Column 11, Line 63: "Wherein" should read --wherein--.

In Claim 11, at Column 12, Lines 41-42: "the fast electrode" should read --the first electrode--.

In Claim 13, at Column 12, Lines 58-59: "wherein the battery pack housing, includes" should read --wherein the battery pack housing includes--.

Signed and Sealed this  
Nineteenth Day of January, 2021

Andrei Iancu  
*Director of the United States Patent and Trademark Office*